(12) United States Patent
Chang et al.

(10) Patent No.: US 8,426,032 B2
(45) Date of Patent: Apr. 23, 2013

(54) COMPOSITE ARTICLES MADE BY PROCESS FOR JOINING STAINLESS STEEL PART AND SILICON CARBIDE CERAMIC PART

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Wen-Feng Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/170,886

(22) Filed: Jun. 28, 2011

(65) Prior Publication Data

US 2012/0107641 A1    May 3, 2012

(30) Foreign Application Priority Data

Oct. 29, 2010    (CN) .......................... 2010 1 0525043

(51) Int. Cl.
*B32B 15/04* (2006.01)
*B32B 15/08* (2006.01)
*B32B 18/00* (2006.01)

(52) U.S. Cl.
USPC ........... 428/627; 428/610; 428/623; 428/663; 428/680; 428/682; 428/685; 428/450

(58) Field of Classification Search ............ 428/610, 428/623, 627, 660, 661, 663, 664, 682, 684, 428/685, 446, 450, 680
See application file for complete search history.

(56) References Cited

U.S. PATENT DOCUMENTS

2008/0255674 A1* 10/2008 Rahaman et al. .......... 623/23.11
2012/0100381 A1*  4/2012 Chang et al. .................. 428/450

FOREIGN PATENT DOCUMENTS

JP              3005637 B2 *  1/2000

OTHER PUBLICATIONS

Machine Translation, Yamakawa et al., JP 3005637 B2, Jan. 2000.*

* cited by examiner

*Primary Examiner* — Michael La Villa
(74) *Attorney, Agent, or Firm* — Altis Law Group, Inc.

(57) ABSTRACT

A process for joining a stainless steel part and a silicon carbide ceramic part comprising: providing a SUS part, a SiC ceramic part, a Mo foil and a Ni foil; depositing a nickel coating on a surface of the SiC ceramic part; placing the SiC ceramic part, the Mo foil, the Ni foil, and the SUS part into a mold, the Mo foil and the Ni foil located between the SiC ceramic part and the SUS part; placing the mold into a chamber of an hot press sintering device, heating the chamber and pressing the SUS part with the nickel coating, the SiC ceramic part, the Mo foil, and the Ni foil at least until the SUS part, the SiC ceramic part, the Mo foil and the Ni foil form a integral composite article.

3 Claims, 2 Drawing Sheets

COMPOSITE ARTICLES MADE BY PROCESS FOR JOINING STAINLESS STEEL PART AND SILICON CARBIDE CERAMIC PART

CROSS-REFERENCE TO RELATED APPLICATIONS

This application is related to U.S. Pat. No. 8,268,454, U.S. Ser. No. 13/170,910), entitled "PROCESS FOR JOINING STAINLESS STEEL PART AND ZIRCONIA CERAMIC PART AND COMPOSITE ARTICLES MADE BY SAME". Such patent has the same assignee as the present application. The above-identified patent is incorporated herein by reference.

BACKGROUND

1. Technical Field

The present disclosure relates to a process for joining a metal part and a ceramic part, especially to a process for joining a stainless steel part and a silicon carbide ceramic part, and a composite article made by the process.

2. Description of the Related Art

It is desirable to join stainless steel parts and silicon carbide ceramic parts. A typical process for joining stainless steel and silicon carbide ceramic is by positioning physically separate nickel foil or molybdenum foil as intermediate layer between stainless steel and silicon carbide ceramic. The foil retains its separate nature through manufacturing in the final product and do not chemically interact with the stainless steel or silicon carbide ceramic. Furthermore, in case of using physically separate nickel foil, due to great difference between the coefficients of heat expansion of the silicon carbide ceramic and the nickel foil, the ceramic/nickel interface has a large thermal stress, thus, the bond between the stainless steel and the silicon carbide ceramic via nickel foil is not as stable as desired. In case of using physically separate molybdenum foil, due to having a relatively low reaction activity, it is difficult for silicon carbide ceramic and molybdenum foil to inter-diffuse into each other, enhancing the difficulty of bonding.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining stainless steel part and silicon carbide ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
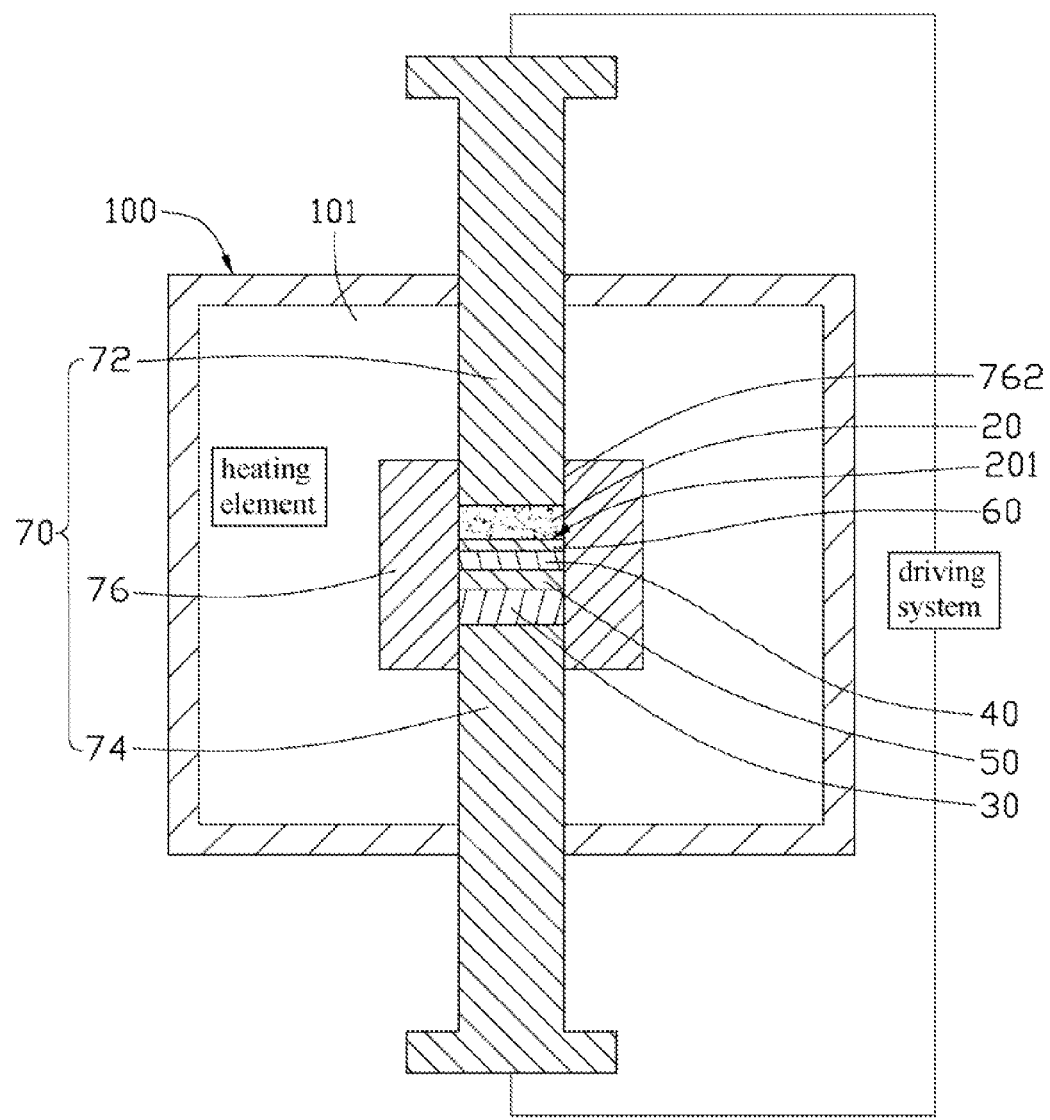
FIG. 1 is a schematic cross-sectional view of an example of a hot press sintering device for implementing the present process.

Referring to FIG. 1, an exemplary process for joining a stainless steel part and a silicon carbide ceramic part, may includes the following steps:

A silicon carbide (SiC) ceramic part 20, a molybdenum (Mo) foil 40, a nickel (Ni) foil 50 and a stainless steel (SUS) part 30 are provided. The Mo foil 40 and the Ni foil 50 are used as a joining medium between the SiC part 20 and the SUS part 30. The Mo foil 40 and the Ni foil 50 each has a thickness of about 0.2 mm-0.5 mm, preferably of about 0.2 mm-0.3 mm.

The SiC ceramic part 20, the SUS part 30, the Mo foil 40 and the Ni foil 50 are pretreated. The pretreatment may include the step of polishing the surfaces of the SiC ceramic part 20, the SUS part 30, the Mo foil 40 and the Ni foil 50 by sandpaper to produce smooth surfaces. Then, the SiC ceramic part 20, the SUS part 30, the Mo foil 40 and the Ni foil 50 are cleaned with an organic solution (e.g., alcohol or acetone) in an ultrasonic cleaner, to remove grease from their surfaces. Then, the SiC ceramic part 20, the SUS part 30, the Mo foil 40 and the Ni foil 50 are rinsed with water and dried.

A nickel coating 60 is directly deposited on a surface 201 of the SiC ceramic part 20. The nickel coating 60 may be formed by physical vapor deposition, such as sputtering. Alternatively, the nickel coating 60 can be formed by electroless plating. The thickness of the nickel coating 60 may be about 2 μm-6 μm, preferably 3 μm-4 μm.

A clamping mold 70 is used to hold the SiC ceramic part 20, the SUS part 30, the Mo foil 40 and the Ni foil 50. The clamping mold 70 includes a pressing member 72, a corresponding supporting member 74 and a receiving part 76. The receiving part 76 defines a cavity 762 for receiving the SiC ceramic part 20, the SUS part 30, the Mo foil 40 and the Ni foil 50. The pressing member 72 and the supporting member 74 extend towards the cavity 762 from opposing directions and can be moved relative to the cavity 762 by a driving system such as hydraulic pressure system. The SiC ceramic part 20, the Mo foil 40, the Ni foil 50 and the SUS part 30 are placed into the cavity 762 and clamped by the pressing member 72 and the supporting member 74. The Mo foil 40 and the Ni foil 50 are inserted between the SiC ceramic part 20 and the SUS part 30. The Mo foil 40 abuts against the nickel coating 60 formed on the SiC ceramic part 20, the Ni foil 50 abuts against the SUS part 30. The pressing member 72 and the supporting member 74 from two opposite sides, bring the surfaces of the parts to be joined into tight contact, for compressing the SiC ceramic part 20, the Mo foil 40, the Ni foil 50 and the SUS part 30. The clamping mold 70 may be made of graphite.

An hot press sintering device 100 including a chamber 101 is provided. The clamping mold 70 is placed into the chamber 101. The chamber 101 is evacuated to an internal pressure of about $2\times10^{-3}$ Pa-$8\times10^{-3}$ Pa. Argon (Ar) as a protective gas is fed into the chamber 101 to create a pressure of about 0.2 MPa-0.5 MPa. Then, the chamber 101 is heated at a rate of about 20 degrees Celsius per minute (° C./min)-40° C./min. When the temperature of the chamber 101 reaches to about 300° C., the pressing member 72 and the supporting member 74 begin to press toward each other at about 10 MPa to press the parts clamped therebetween. The chamber 101 is heated at a rate of about 60° C./min-120° C./min as the clamping pressure applied by the members 72,74 steadily increases, until the temperature of the chamber 101 reaches to about 850° C.-1100° C., and the clamping pressure reaches to about 100 MPa. The pressure and temperature are maintained in their respective peak ranges for about 15 min-35 min, so that the Mo foil 40, the Ni foil 50 and the nickel coating 60 will chemically interact with each other, and the Mo foil 40 chemically interacts with the nickel coating 60 and the SiC ceramic part 20, and the Ni foil 50 chemically interacts with the SUS part 30. Accordingly, the SiC ceramic part 20 and the SUS part 30 are connected by the Mo foil 40, the Ni foil 50 and the nickel coating 60 to form a composite article 10. The composite article 10 is removed after the chamber 101 is cooled.

Figure 2:
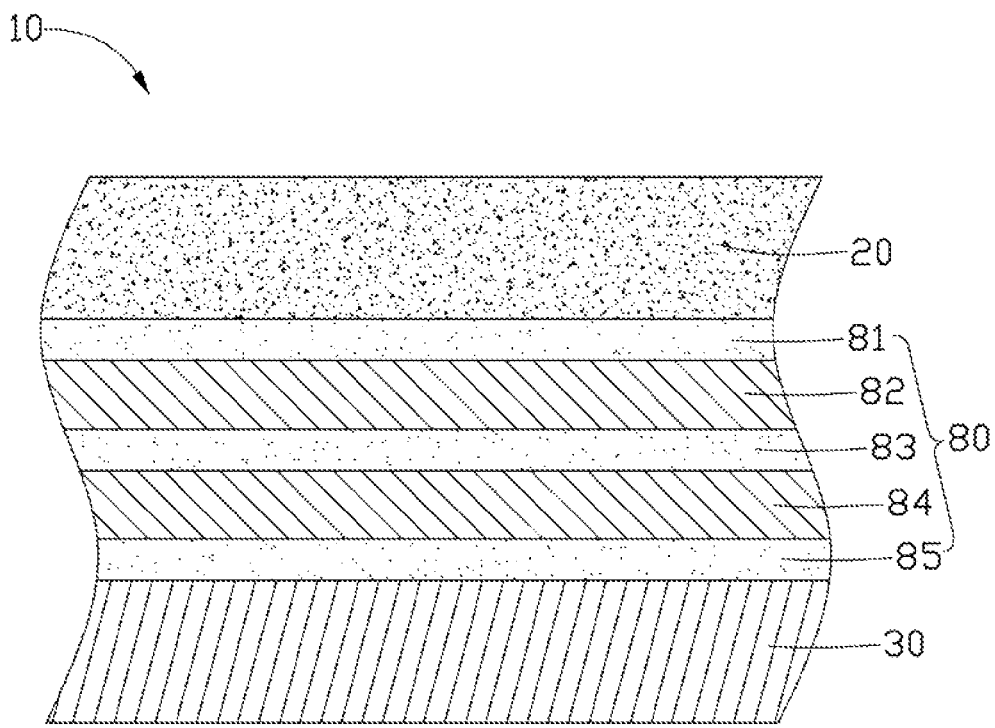
FIG. 2 is a cross-sectional view of an exemplary embodiment of the present article made by the present process.

Referring to FIG. 2, in the process of making the composite article 10, the Mo foil 40, Ni foil 50 and the nickel coating 60 act as intermediate layers to form a connecting layer 80 that connect the SiC ceramic part 20 and the SUS part 30. The heat expansion rate of Mo foil 40 is close to that of the SiC ceramic part 20, and the nickel coating 60 deposited on the SiC ceramic part 20 has a relatively high reaction activity, thus the SiC ceramic part 20 can substantially connect with the Mo foil 40. The Ni foil 50 has a relatively high reaction activity and has good solid solubility in SUS, thus the SUS part 30 can substantially connect to the Ni foil 50. Furthermore, the combination of the Mo foil 40, Ni foil 50 and the nickel coating 60 to form the connecting layer 80 results in a connecting layer 80 having a rate of heat expansion that gradually changes from one end to the other. Therefore, the SiC ceramic part 20 is securely connected with the SUS part 30 and more able to cope with temperature changes.

The composite article 10 manufactured by the present process includes the SiC ceramic part 20, the SUS part 30 and a multi-layered connecting layer 80 connecting the SiC ceramic part 20 to the SUS part 30. The connecting layer 80 is formed by depositing the nickel coating 60 on the SiC ceramic part 20 and placing the Mo foil 40 and the Ni foil 50 between the SiC ceramic part 20 and the SUS part 30, and then heating and pressing the SiC ceramic part 20 and the SUS part 30 as previously described. The various layers of the connecting layer 80 result from differing chemical interaction between the SUS part 30, nickel coating 60, Mo foil 40, Ni foil 50, and SiC ceramic part 20. In particular, the connecting layer 80 includes:

a) a first transition layer 81: The first transition layer 81 is adjacent to the SiC ceramic part 30. The first transition layer 81 results from chemical interaction of the SiC ceramic part 20, nickel coating 60, and the Mo foil 40. The first transition layer 81 mainly includes compounds comprising Ni element and Si element (such as NiSi), and Ni with Mo solid solutions. The nickel coating 60 completely reacts with the SiC ceramic part 20 and the Mo foil 40 during the bonding processing;

b) a Mo layer 82: The Mo layer 82 is adjacent to the first transition layer 81. The Mo layer 80 results from portions of the Mo foil 40 that do not react with either the SiC ceramic part 20 or the Ni foil 50;

c) a second transition layer 83: The second transition layer 83 is located between the Mo layer 82 and the Ni layer 84. The second transition layer 83 mainly includes Mo with Ni solid solutions, and intermetallic compounds comprising Mo and Ni. The compounds and solutions result from chemical reactions between adjacent portions of the Mo foil 40 and Ni foil 50;

d) an Ni layer 84: The Ni layer 84 results from portions of the Ni foil 50 that do not react with either the Mo foil 40 or the SUS part 30; and e) a third transition layer 85: The third transition layer 85 is located between the Ni layer 84 and the SUS part 30 and connects together the Ni layer 84 and the SUS part 30. The third transition layer 85 mainly includes intermetallic compounds comprising Ni and Fe, and Ni with Fe solid solutions. The compounds and solutions result from chemical reactions between adjacent portions of the Ni foil 50 and the SUS part 30.

The thermal expansion rate of the connecting layer 80 gradually changes from a value close to that of the SiC ceramic part 20 (in the area of 81) to a value close to that of SUS part 30 (in the area of 85). This results in a composite article 10 well suited to temperature changes due to the gradual, rather than abrupt, changes in its internal thermal expansion rates.

Furthermore, the connecting layer 80 of the composite article 10 has no crack or aperture, and has a smooth surface. The composite article 10 has a shear strength in a range from about 50 MPa to about 80 MPa, and a tension strength in a range from about 60 MPa to about 100 MPa.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A composite article, comprising:
   a SiC ceramic part,
   a stainless steel part, and
   a connecting layer connecting the SiC ceramic part to the stainless steel part, wherein the connecting layer is formed by depositing a nickel coating on the SiC ceramic part and placing a Mo foil and a Ni foil between the SiC ceramic part and the stainless steel part with the Mo foil abutting the SiC ceramic part and the Ni foil abutting the stainless steel part, then heating and pressing the SiC ceramic part with the nickel coating, the stainless steel part, the Mo foil and the Ni foil;
   wherein the connecting layer includes a first transition layer adjacent to the SiC part, a Mo layer, a second transition layer, a Ni layer, and a third transition layer adjacent to the stainless steel part, and in that order; the first transition layer located between the SiC ceramic part and the Mo layer mainly includes compounds comprising Ni element and Si element, and Ni with Mo solid solutions; and the thermal expansion rate of the connecting layer gradually changes from that of the first transition layer to that of the third transition layer.

2. The composite article as claimed in claim 1, wherein the second transition layer located between the Mo layer and the Ni layer mainly includes Mo with Ni solid solutions, and intermetallic compounds comprising Mo and Ni.

3. The composite article as claimed in claim 1, wherein the third transition layer located between the Ni layer and the stainless steel part mainly includes intermetallic compounds comprising Ni and Fe, and Ni with Fe solid solutions.

* * * * *